United States Patent
Matsubara

(10) Patent No.: US 7,614,297 B2
(45) Date of Patent: Nov. 10, 2009

(54) MULTI-VORTEX FLOWMETER

(75) Inventor: Naoki Matsubara, Tokyo (JP)

(73) Assignee: Oval Corporation, Tokyo (JP)

( * ) Notice: Subject to any disclaimer, the term of this patent is extended or adjusted under 35 U.S.C. 154(b) by 0 days.

(21) Appl. No.: 11/630,413

(22) PCT Filed: Sep. 9, 2004

(86) PCT No.: PCT/JP2004/013485

§ 371 (c)(1),
(2), (4) Date: Dec. 21, 2006

(87) PCT Pub. No.: WO2006/008837

PCT Pub. Date: Jan. 26, 2006

(65) Prior Publication Data

US 2008/0028849 A1     Feb. 7, 2008

(30) Foreign Application Priority Data

Jul. 15, 2004     (JP)     ............................. 2004-208965

(51) Int. Cl.
G01F 7/00     (2006.01)

(52) U.S. Cl. .................................................. 73/204.19
(58) Field of Classification Search ................ 73/202.5, 73/204.11, 204.16, 204.17, 204.23, 861.18, 73/861.21–862.24
See application file for complete search history.

(56) References Cited

U.S. PATENT DOCUMENTS

| 4,320,650 | A | * | 3/1982 | Kita | ........................ | 73/861.22 |
| 4,497,203 | A | * | 2/1985 | Wada | ...................... | 73/204.15 |
| 4,526,040 | A | * | 7/1985 | Matsubara | ............... | 73/861.24 |
| 4,565,098 | A | * | 1/1986 | Herzl | ...................... | 73/861.22 |
| 5,020,373 | A | * | 6/1991 | Kamiunten et al. | ...... | 73/861.22 |
| 5,230,245 | A | * | 7/1993 | Kamiunten et al. | ........... | 73/195 |
| 5,736,647 | A | * | 4/1998 | Matsubara et al. | ....... | 73/861.22 |
| 5,861,556 | A | * | 1/1999 | Nukui et al. | ............. | 73/204.17 |

FOREIGN PATENT DOCUMENTS

| JP | 62-021946 | 6/1987 |
| JP | 06-034417 | 2/1994 |
| JP | 3119782 | 12/2000 |

* cited by examiner

Primary Examiner—Lisa M Caputo
Assistant Examiner—Freddie Kirkland, III
(74) Attorney, Agent, or Firm—Wenderoth, Lind & Ponack, L.L.P.

(57) ABSTRACT

A flowmeter having a vortex type detection means with a measurement tube provided in a flow passage that allows passage of a fluid therethrough, and having a vortex generator provided in the measurement tube that is opposed to a flow of the fluid. The flowmeter also includes a vortex detector detecting a change based on a Karman vortex generated by the vortex generator, a thermal type detection means having a temperature sensor and a heating temperature sensor protruding into the flow passage, and a flow rate converter controlling a power supply amount related to heating of the heating temperature sensor for attaining a fixed difference in temperature between the temperature sensor and the heating temperature sensor and calculating a flow rate of the fluid from the power amount. The flow rate converter also calculates the flow rate of the fluid from a detection value obtained by the vortex detector.

20 Claims, 4 Drawing Sheets

MULTI-VORTEX FLOWMETER

BACKGROUND OF THE INVENTION

1. Field of the Invention

The present invention relates to a multi-vortex flowmeter endowed with both a function of a vortex flowmeter and a function of a thermal flowmeter.

2. Related Art

Vortex flowmeters and thermal flowmeters are used for measurement of a flow rate of a fluid to be measured flowing through a flow tube. As is well known in the art, the vortex flowmeter utilizes the fact that when a vortex generator is arranged in a fluid flow, the number of Karman vortexes generated by the vortex generator per unit time (vortex frequency) is in proportion to the flow rate regardless of whether the fluid is a gas or a liquid in a given range of Reynolds number, and this constant of proportionality is called the Strouhal number. Examples of a vortex detector include a thermal sensor, a distortion sensor, an optical sensor, a pressure sensor, and an ultrasonic wave sensor. Those are capable of detecting a thermal change, a change in lift, etc., due to vortexes. The vortex flowmeter is a simple flowmeter capable of measuring a flow rate without being affected by physical properties of the fluid to be measured, and is widely used for the flow rate measurement of gases and other fluids (see, for example, JP 2869054 B (page 3, FIG. 1)). On the other hand, the thermal flowmeter is equipped with a fluid temperature detecting sensor and a heating side temperature sensor, and is controlled such that the temperature of the heating side temperature sensor (flow velocity sensor (heater)), which is endowed with a function of a temperature sensor and a function of a heating sensor, exhibits a fixed difference in temperature with respect to temperature as measured by the fluid temperature detecting sensor. This is due to the fact that the quantity of heat taken by the heater when the fluid to be measured is caused to flow is related to the mass flow rate, and the mass flow rate is calculated from the heating electric power amount with respect to the heater (see, for example, JP 2004-12220 A (page 6, FIG. 4)).

BRIEF SUMMARY OF THE INVENTION

It is known that the vortex flowmeter is not suited for minute flow rate measurement and low flow rate measurement. It is also known that the thermal flowmeter is not suited for high flow rate measurement. Thus, when the fluid to be measured is one whose flow rate varies over a wide range from a minute flow rate to a large flow rate, there is a problem in that the measurement range cannot be sufficiently covered with only one of those two types of flowmeters.

The present invention has been made in view of the above problem. It is an object of the present invention to provide a multi-vortex flowmeter capable of performing measurement with high accuracy from a minute flow rate to a large flow rate.

The object of the present invention is attained by providing a multi-vortex flowmeter including: a vortex type detection means having a measurement tube provided in a flow passage of a flow tube and allowing passage of a fluid to be measured; a vortex generator provided in the measurement tube so that a vortex generator is opposed to a flow of the fluid to be measured; and a vortex detector for detecting a change based on a Karman vortex generated by the vortex generator; a thermal type detection means having a temperature sensor and a heating temperature sensor protruding into the flow passage; and a flow rate converter for controlling a power supply amount related to heating of the heating temperature sensor to attain a constant temperature difference between the temperature sensor and the heating temperature sensor and for calculating a flow rate of the fluid to be measured from the power supply amount and for calculating the flow rate of the fluid to be measured from a detection value obtained by the vortex detector.

With this construction, according to the present invention, it is possible to provide a flowmeter endowed with the functions of both a vortex flowmeter and a thermal flowmeter. That is, according to the present invention, measurement is performed by using the function of a thermal flowmeter in a minute flow rate range or a low flow rate range, and measurement is performed by using the function of a vortex flowmeter in a high flow rate range. Further, in the present invention, by overlapping each other to some degree the high flow rate range measurement using the function of the thermal flowmeter and the low flow rate measurement using the function of the vortex flowmeter and performing switching therebetween by the flow rate converter, it is possible to perform measurement with high accuracy from a minute flow rate to a large flow rate. The flow rate converter performs computation display, output, etc.

Further, the object of the present invention is attained by providing the multi-vortex flowmeter, in which: the temperature sensor and the heating temperature sensor are arranged in the vicinity of the measurement tube; and the measurement tube is provided with a temperature sensor retaining portion for retaining the temperature sensor and the heating temperature sensor.

With this construction, according to the present invention, it is possible to retain the temperature sensor and the heating temperature sensor by the temperature sensor retaining portion of the measurement tube. According to the present invention, by retaining the temperature sensor and the heating temperature sensor by the temperature sensor retaining portion, it is possible to mitigate stress concentration generated in the temperature sensor and the heating temperature sensor in the case of a large flow rate.

Further, the object of the present invention is attained by providing the multi-vortex flowmeter, in which the measurement tube and the temperature sensor retaining portion are integrated with each other and formed as a single component.

With this construction, according to the present invention, it is possible to retain the temperature sensor and the heating temperature sensor without providing any new component.

Further, the object of the present invention is attained by providing the multi-vortex flowmeter, in which respective forward ends of the temperature sensor and the heating temperature sensor are arranged at a center or in a portion around the center of the flow tube.

With this construction, according to the present invention, it is possible to arrange the respective temperature sensing portions of the temperature sensor and the heating temperature sensor away from the wall of the flow tube. Thus, according to the present invention, the heat conducted from the exterior of the flow tube to the interior of the flow tube does not easily act on the respective temperature sensing portions of the temperature sensor and the heating temperature sensor.

Further, the object of the present invention is attained by providing the multi-vortex flowmeter, in which the vortex type detection means and the thermal type detection means are formed so that the vortex-type detection means and the thermal type detection means are capable of insertion and extraction with respect to a hole formed in the flow tube.

With this construction, according to the present invention, it is possible to form a flowmeter of a small size. Further, since the vortex-type detection means and the thermal-type detection means are formed so as to be capable of insertion and extraction, it is possible, according to the present invention, to easily perform mounting, maintenance, etc.

According to the present invention according to claim 1, it is possible to measure the flow rate of a fluid to be measured with high accuracy from a minute flow rate to a large flow rate. The multi-vortex flowmeter of the present invention is more advantageous in terms of cost, installation space, etc. as compared with the case in which a vortex flowmeter and a thermal flowmeter are provided separately.

According to the present invention according to claim 2, it is possible to mitigate stress concentration in the temperature sensor and the heating temperature sensor in the case of a large flow rate. Thus, it is possible to improve the temperature sensor and the heating temperature sensor in terms of durability.

According to the present invention according to claim 3, it is possible to suppress an increase in the number of components. It is possible to provide an inexpensive flowmeter.

According to the present invention according to claim 4, it is possible to achieve a further enhancement in measurement accuracy.

According to the present invention according to claim 5, it is possible to realize a compact construction, making it possible to provide an inexpensive flowmeter. Further, it is possible to facilitate mounting, maintenance, etc.

DETAILED DESCRIPTION OF THE INVENTION

In the following, the present invention will be described with reference to the drawings.

Figure 1:
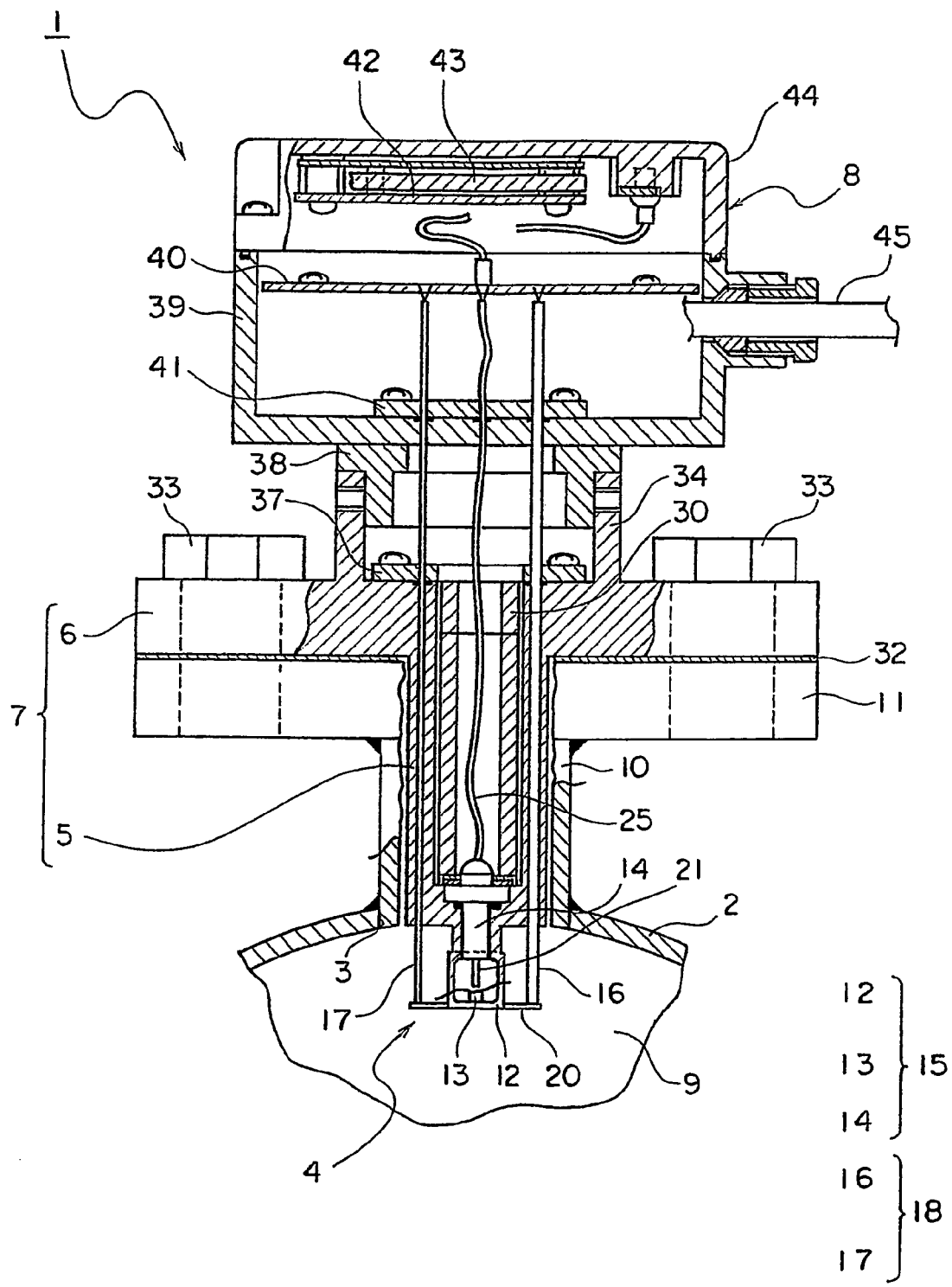
FIG. 1 is a sectional view of a multi-vortex flowmeter according to an embodiment of the present invention.
Figure 2:
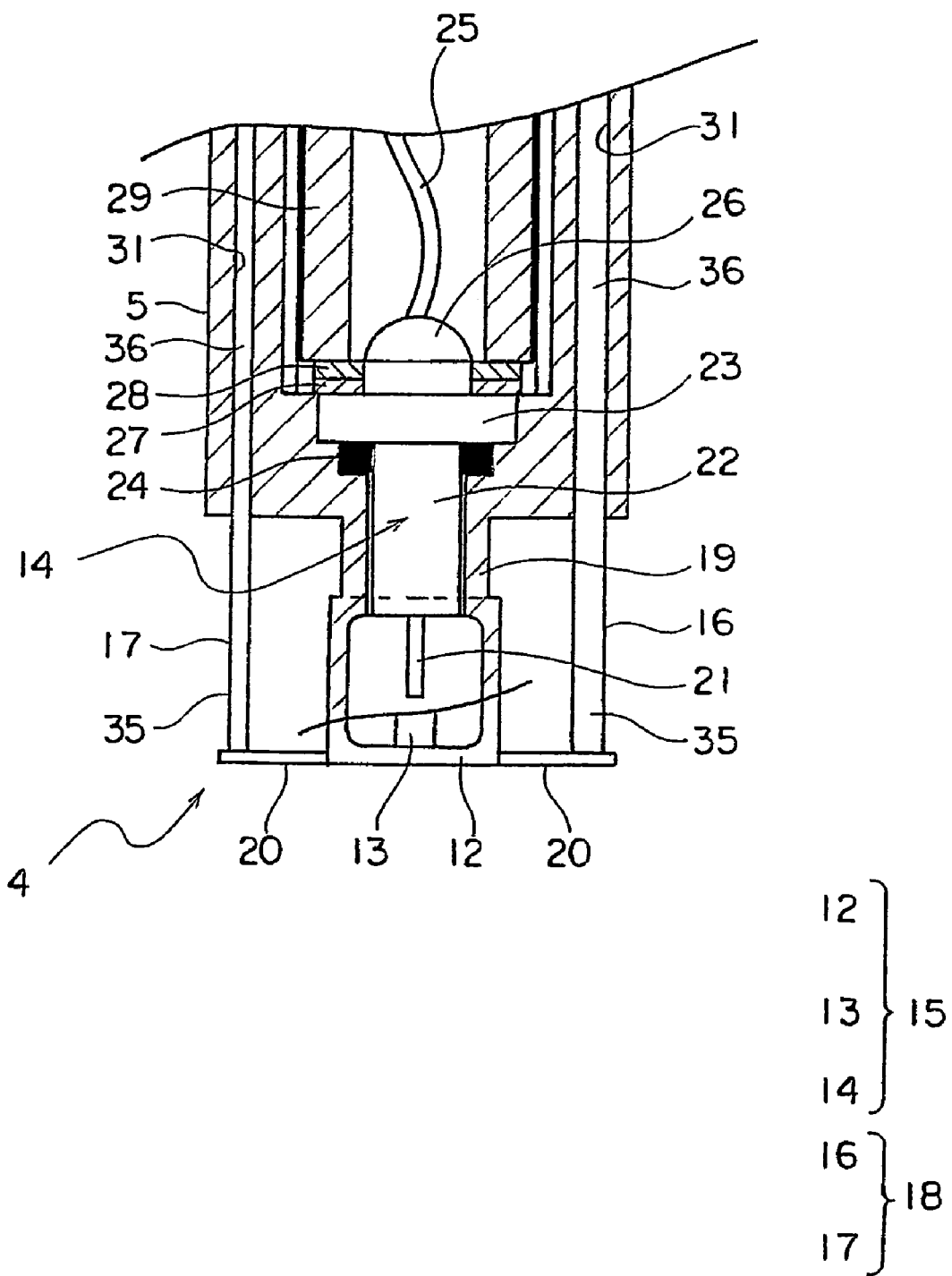
FIG. 2 is an enlarged view of a main portion of FIG. 1.
Figure 3:
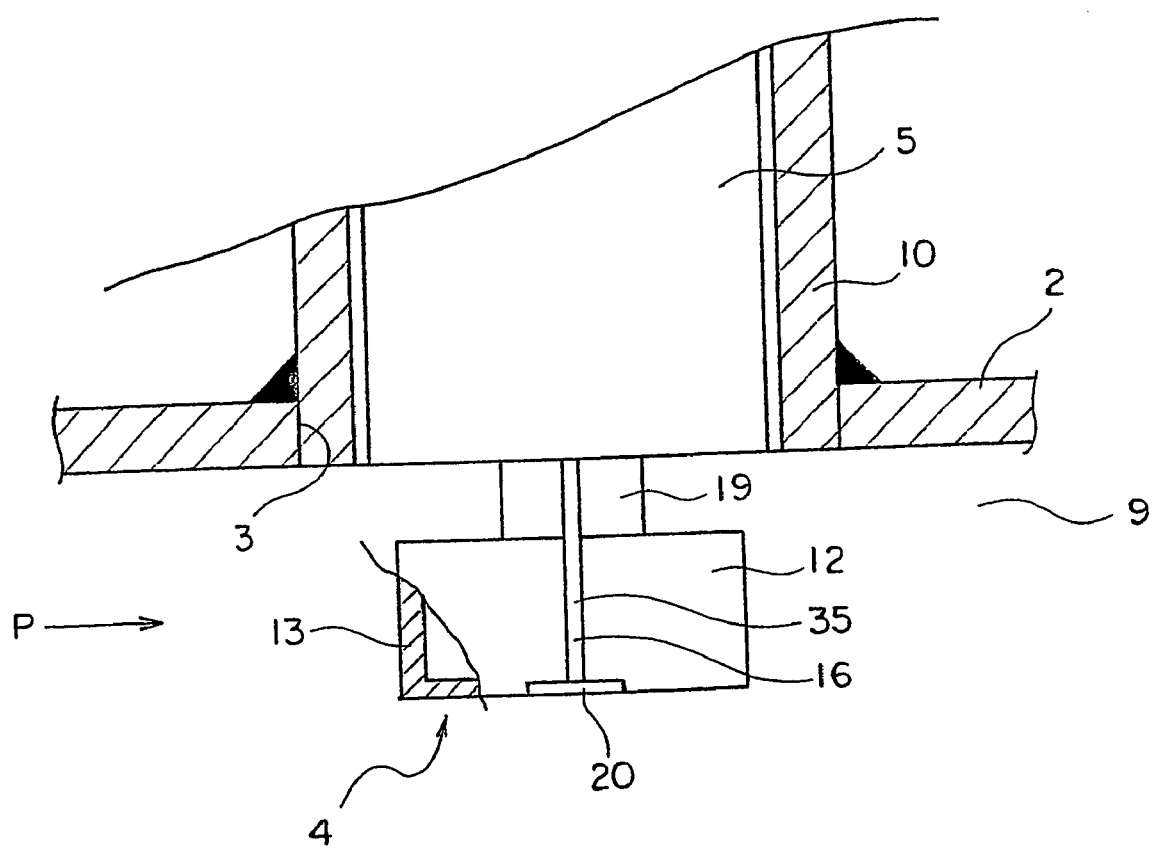
FIG. 3 is a side view of a detecting portion.
Figure 4:
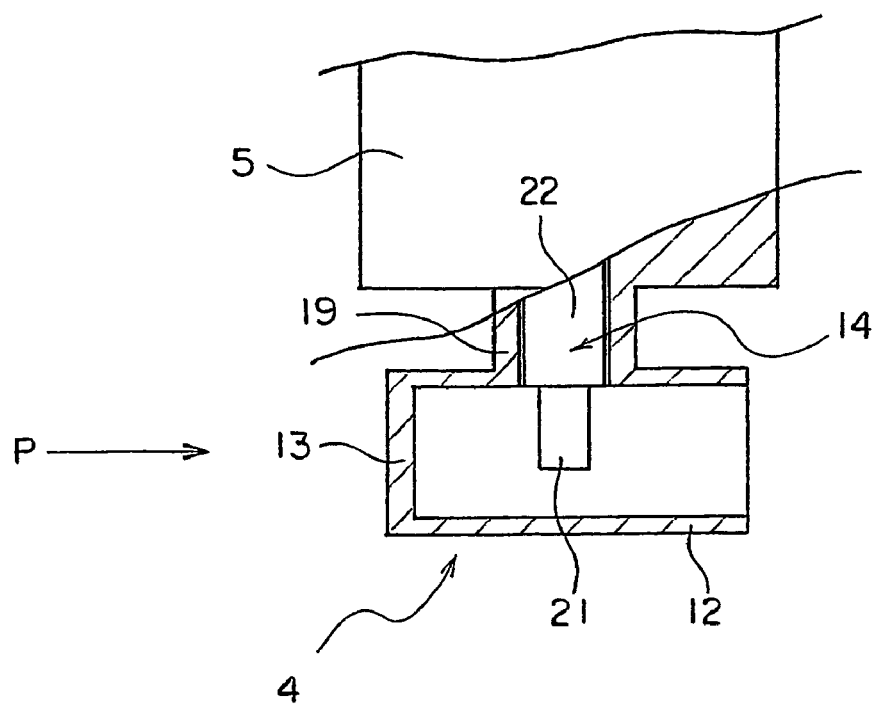
FIG. 4 is a sectional view of the detecting portion.
Figure 5:
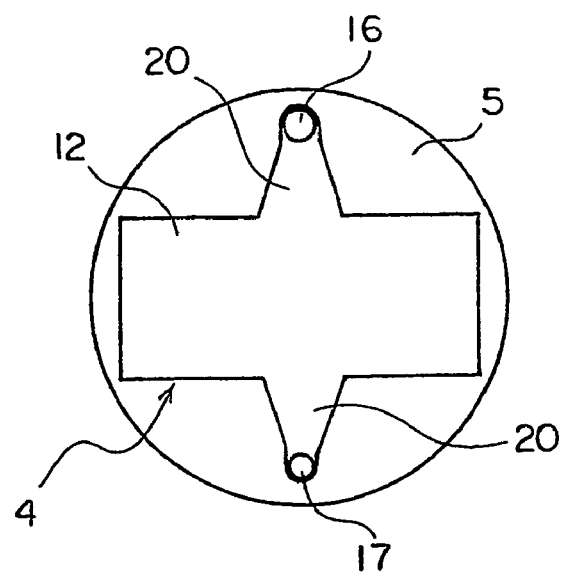
FIG. 5 is a bottom view of the detecting portion.

FIG. 1 is a sectional view of a multi-vortex flowmeter according to an embodiment of the present invention. FIG. 2 is an enlarged view of a main portion of FIG. 1, and FIGS. 3 through 5 are a side view, a sectional view, and a bottom view, respectively, of a detecting portion.

In FIG. 1, a multi-vortex flowmeter according to the present invention is denoted by reference numeral 1. The multi-vortex flowmeter 1 is endowed with both the function of a vortex flowmeter and a function of a thermal flowmeter. The multi-vortex flowmeter 1 is formed as an insertion type flowmeter whose detection portion 4 is inserted into a hole 3 formed to pass through a flow tube 2. The multi-vortex flowmeter 1 of the present invention is equipped with a probe portion 7 having the detecting portion 4, a shaft portion 5, and a fixing portion 6, and a flow rate converter 8. In the following, the components will be described with reference to FIGS. 1 through 5.

The flow tube 2 is of a cylindrical configuration. In this embodiment, it is arranged so as to extend in the horizontal direction (It may also be arranged so as to extend in the vertical direction). Inside the flow tube 2, there is formed a flow passage 9, through which a fluid to be measured flows in the direction of an arrow P. In an upper portion of the flow tube 2, there is formed the circular hole 3. Firmly attached to the hole 3 is one end of a probe guide cylinder 10 of a cylindrical configuration. The detecting portion 4 and the shaft portion 5 are inserted into the probe guide cylinder 10. A circular flange 11 is firmly attached to the other end of the probe guide cylinder 10. In this embodiment, the flow tube 2 and the probe portion 7 are connected together through the flange connection which, however, should not be construed restrictively. That is, it is also possible to adopt a screwed joint or a flareless type joint.

The detecting portion 4 generally refers to the respective flow rate detecting portions of a vortex-type detection means 15 having a measurement tube 12, a vortex generator 13, and a vortex detector 14, and a thermal-type detection means 18 having a temperature sensor 16 and a heating temperature sensor 17. As shown in FIG. 1, the detecting portion 4 is arranged, for example, on top of the flow passage 9. The detecting portion 4 is formed so as to occupy not an entire tube section but a part of the tube section of the flow tube 2. Despite the fact that the multi-vortex flowmeter of the present invention is endowed with both the function of a vortex flowmeter and the function of a thermal flowmeter, the multi-vortex flowmeter 1 of the present invention is formed so as to have a small detecting portion 4.

The measurement tube 12 is formed as a cylinder with a rectangular sectional configuration. The measurement tube 12 is arranged and formed so as to extend in the direction of the arrow P, in which the fluid to be measured flows. The measurement tube 12 is connected to the bottom wall of the shaft portion 5 through the intermediation of a connecting cylindrical portion 19. The connecting cylindrical portion 19 is formed so as to be continuous with the center of an upper wall of the measurement tube 12. Formed on the connecting cylindrical portion 19 are the vortex generator 13 and a temperature sensor retaining portion 20 (In this embodiment, they are formed integrally which, however, should not be construed restrictively).

The vortex generator 13 is a portion for generating vortexes within the measurement tube 12, and is configured so as to be opposed to the flow of the fluid to be measured. In this embodiment, the vortex generator 13 is formed as a triangular prism (This configuration is only given by way of example. Patent Document 1, i.e., JP 2869054 B, discloses some examples of the configuration of the vortex generator). The vortex generator 13 is formed at an opening portion on the side of the measurement tube 12 where the fluid to be measured flows in. The vortex generator 13 is formed so as to be situated at the center of the opening portion. Further, the vortex generator 13 is formed so as to be integral with the upper wall and a lower wall of the measurement tube 12.

Here, the vortexes generated by the vortex generator 13 will be described. The vortexes are separated from a position where there is a big change in momentum caused by the flow of the fluid to be measured entering at the opening portion of the measurement tube 12 and flowing along the vortex generator 13. When the sectional configuration of the vortex generator 13 is triangular as in this embodiment, the edge portions of the triangle constitute the separation points. The vortexes separated from the vortex generator 13 to flow out are generated alternately in a zigzag fashion in accordance with the Karman's stable vortex condition, and flow out while forming vortex streets maintaining a fixed inter-vortex distance and a fixed inter-street distance. The inter-vortex distance can be obtained from the number of vortexes generated per unit time, that is, the vortex frequency, and from the flow velocity per unit time calculated based on the flow rate obtained, for example, from the fluid having flowed into a reference container, such as a reference tank.

The temperature sensor retaining portion 20 is formed so as to horizontally protrude from the lower wall of the measurement tube 12, in other words, so as to protrude from both side walls of the measurement tube 12. The temperature sensor retaining portion 20 is formed so as to exhibit a triangular configuration in plan view. The temperature sensor retaining portion 20 is configured as if the measurement tube 12 is provided with fins. In the vicinity of the apexes of the triangle of the temperature sensor retaining portion 20, there are formed holes (denoted by no reference numerals) into which the respective forward ends of temperature sensor 16 and the heating temperature sensor 17 are inserted. The temperature sensor retaining portion 20 is arranged and formed such that the temperature sensor 16 and the heating temperature sensor 17 are respectively situated on either side of the vortex detector 14.

The vortex detector 14 is a sensor for vortex detection, which, in this example, is comprised of a pressure sensor. The vortex sensor 14 has a pressure sensing plate (sensor pressure sensing plate) 21 arranged on the downstream side of the vortex generator 13 inside the measurement tube 12. The vortex detector 14 has, in an oscillation tube 22, a pressure detection element plate having a piezoelectric element or a strain gauge. The vortex detector 14 is formed so as to detect with the pressure sensing plate 21 a fluctuating pressure (alternating pressure) based on the Karman vortexes generated by the vortex generator 13. The pressure sensing plate 21 is arranged and formed so as to extend from one end of the oscillation tube 22. The oscillation tube 22 is inserted into the connecting cylindrical portion 19 and is mounted such that solely the pressure sensing plate 21 extends into the measurement tube 12. It should be noted that this arrangement of the pressure sensing plate 21 is only given by way of example.

A flange portion 23 is formed at the other end of the oscillation tube 22. The flange portion 23 is formed in order to fix in position the vortex detector 14 inserted into the shaft portion 5. An O-ring 24 is arranged between the flange portion 23 and the shaft portion 5. The O-ring 24 is provided in order to prevent intrusion of the fluid to be measured into the shaft portion 5. The vortex detector 14 is provided with a transmission line 25 for outputting a signal from the vortex detector 14. One end of the transmission line 25 is fixed to the end portion of the vortex detector 14 and protected by a molded portion 26 molded by using a molding material. The transmission line 25 is provided in order to obtain power and to transmit the sensor output to the flow rate converter 8 side.

Inside the shaft portion 5, there are provided a ring-shaped spacer 27, a belleville spring 28, and a cylindrical spacer 29. These are provided in order to hold down the vortex detector 14, and are retained by a through-type set screw 30 threadedly engaged with the opening of the shaft portion 5. Formed in the shaft portion 5 are two through-holes 31 extending axially through a peripheral side wall. The through-holes 31 will be described below. A circular fixing portion 6 is firmly attached to the shaft portion 5 in conformity with the flange 11 of the probe guide cylinder 10. The fixing portion 6 is a portion for fixing the multi-vortex flowmeter 1 of the present invention to the flow tube 2, and is formed so as to be fastened by bolts 33, with packing 32 being held between itself and the flange 11 of the probe guide cylinder 10. Formed on the fixing portion 6 is a mounting cylinder portion 34 with respect to the flow rate converter 8.

The vortex type detection means 15 is provided in order to obtain the flow velocity or the flow rate of the fluid to be measured flowing through the flow tube 2 with the measurement tube 12, the vortex generator 13, and the pressure sensing plate 21 of the vortex detector 14 inserted into the flow tube 2. The flow velocity or the flow rate of the fluid to be measured flowing through the flow tube 2 is obtained by calculating the flow velocity or the flow rate of the fluid to be measured flowing through the measurement tube 12 as a partial flow velocity or a partial flow rate in the flow tube 2. This is based on the fact that even if measurement is performed not on the entire tube section of the flow tube 2 but on a part thereof, it is possible to estimate the total flow rate if the flow is uniform. That is, the flow velocity distribution of a rectified fluid flowing through a straight tube is given as a function of the Reynolds number, so it is possible to convert the flow velocity at a position at a certain distance from the central portion of the flow tube 2 to an average flow velocity in the flow tube 2.

Known sensors are used for both the temperature sensor 16 and the heating temperature sensor 17 constituting the thermal type detection means 18. Here, a specific description of their construction will be omitted. The temperature sensor 16 in this embodiment is a bar-shaped sensor for temperature, and the heating temperature sensor 17, which is also bar-shaped, is a flow velocity sensor (heater) having the function of a temperature sensor and the function of a heating sensor. The respective forward end portions of the temperature sensor 16 and the heating temperature sensor 17 are formed as temperature sensing portions 35, and the respective middle portions thereof are formed as fixing portions 36. The temperature sensor 16 and the heating temperature sensor 17 are respectively inserted into the through-holes 31 of the shaft portion 5 and fixed therein.

The respective temperature sensing portions 35 of the temperature sensor 16 and the heating temperature sensor 17 protrude into the flow passage 9 of the flow tube 2, and the forefront portions thereof are retained by the temperature sensor retaining portion 20. The temperature sensing portions 35 are arranged in the vicinity of the measurement tube 12. The temperature sensor 16 and the heating temperature sensor 17 are arranged in a lateral row along with the vortex detector 14 (This arrangement is only given by way of example. Another arrangement will do as long as it does not interfere with the vortex detection). It is also possible to elongate the temperature sensing portions 35 of the temperature sensor 16 and the heating temperature sensor 17 so that they may further protrude from the temperature sensor retaining portion 20 (to avoid the action of the heat conducted from outside to the flow tube 2).

The rear ends of the temperature sensor 16 and the heating temperature sensor 17 protrude from the inner side of the mounting cylinder portion 34 of the fixing portion 6, and are inserted into the flow rate converter 8. The temperature sensor 16 and the heating temperature sensor 17 are sealed by O-rings (indicated by no reference numeral) mounted to the opening edge portions of the through-holes 31. An O-ring presser is denoted by reference numeral 37. The O-ring presser 37 is fixed to the inner side of the mounting cylinder portion 34 by screws. Although not particularly indicated by any numerals, formed in the O-ring presser 37 are through-holes for the temperature sensor 16 and the heating temperature sensor 17, and a lead-out through-hole for the transmission line 25.

The flow rate converter 8 is mounted to the end portion of the mounting cylinder portion 34 through the intermediation of an adapter 38. The flow rate converter 8 has a converter case 39. Inside the converter case 39, there is mounted an amplifier board 40. Connected to the amplifier board 40 are the respective leads of the temperature sensor 16 and the heating temperature sensor 17, and the transmission line 25 of the vortex detector 14. The temperature sensor 16, the heating temperature sensor 17, and the transmission line 25 extend through the converter case 39 to be drawn into the interior. The temperature sensor 16, the heating temperature sensor 17, and the transmission line 25 are sealed by 0-rings (indicated by no reference numeral). An 0-ring presser fixed to the inner side of the converter case 39 by screws is indicated by reference numeral 41. The temperature sensor 16, the heating temperature sensor 17, the vortex detector 14, and the amplifier board 40 have functions of a flow rate measurement portion and a flow rate computing portion. A main body cover 44 having a switch board 42 and a display board 43 is mounted to the opening portion of the converter case 39, with packing (indicated by no reference numeral) being held therebetween. A transmission cable 45 is connected to one side wall of the converter case 39.

In the above-described construction and structure, the multi-vortex flowmeter 1 of the present invention allows proper selective use of the function of the vortex flowmeter and the function of a thermal flowmeter according to the condition of the flow of the fluid to be measured flowing through the flow passage 9 of the flow tube 2. That is, in the minute flow rate range and the low flow rate range, measurement is performed by the function of a thermal flowmeter, and in the high flow rate range measurement is performed by the function of a vortex flowmeter. In the multi-vortex flowmeter 1 of the present invention, the high flow rate range measurement using the function of the thermal flowmeter and the low flow rate measurement using the function of the vortex flowmeter overlap each other to some extent, and switching therebetween is performed by the flow rate converter 8.

First, an operation when measurement is performed in the minute flow rate range and the low flow rate range, that is, an operation when measurement is performed by the function of the thermal flowmeter, will be described. The heating temperature sensor 17 performs flow rate measurement based on the temperature detected by the temperature sensor 16. That is, in the flow rate measurement portion and the flow rate computing portion of the multi-vortex flowmeter 1 of the present invention, the heating temperature sensor 17 is heated (an electric current is caused to flow therethrough) such that the difference in temperature between the temperature sensor 16 and the heating temperature sensor 17 becomes a fixed value (e.g., +30° C.), and a mass flow rate is calculated from an electric current value related to that heating. The mass flow rate calculated is converted to a predetermined unit, and then displayed on a display portion provided in an upper portion of the main body cover 44 or transmitted through the transmission cable 45 to be displayed on a display device (not shown).

To give some additional illustration on the calculation of the mass flow rate, when the fluid to be measured (not shown) is caused to flow in the direction of the arrow P, the heating temperature sensor 17 is cooled by the fluid to be measured. To control the difference in temperature between the temperature sensor 16 and the heating temperature sensor 17 to a fixed value, it is necessary to cause further electric current to flow through the heating temperature sensor 17. It is known that the electric current flowing through the heating temperature sensor 17 at this time is in proportion to the mass flow rate, and the mass flow rate is calculated by utilizing this fact.

Next, an operation when measurement is performed by the function of the vortex flowmeter will be described. The fluctuating pressure (alternating pressure) based on the Karman vortexes generated by the vortex generator 13 is detected by the pressure sensing plate 21. Then, the flow velocity or the flow rate of the fluid to be measured flowing through the measurement tube 12 is calculated from the detection value obtained by the vortex detector 14 as a partial flow velocity or a partial flow rate in the flow tube 2, thereby calculating the flow velocity or the flow rate (volume flow rate) of the fluid to be measured flowing through the flow tube 2. The flow velocity or the flow rate calculated is converted to a predetermined unit, and is then displayed on the display portion provided in the upper portion of the main body cover 44, or transmitted through the transmission cable 45 to be displayed on the display device (not shown).

As described above with reference to FIGS. 1 through 5, the multi-vortex flowmeter 1 of the present invention can measure the flow rate of the fluid to be measured with high accuracy from zero or a minute flow rate to a large flow rate (allowing expansion of the flow rate range to approximately 1:500). Further, the multi-vortex flowmeter 1 of the present invention is more effective in terms of cost, installation space, etc. as compared with the case in which a vortex flowmeter and a thermal flowmeter are provided separately. Since the multi-vortex flowmeter 1 of the present invention is an insertion type flowmeter, the multi-vortex flowmeter can be formed in a compact construction. Since the multi-vortex flowmeter 1 of the present invention is an insertion type flowmeter, the multi-vortex flowmeter 1 can be easily installed in existing piping, thereby achieving a reduction in installation cost. Furthermore, since the multi-vortex flowmeter 1 of the present invention is an insertion type flowmeter, the multi-vortex flowmeter 1 can be provided at low price.

Further, it goes without saying that the present invention allows various modifications without departing from the gist thereof.

The invention claimed is:

1. A multi-vortex flowmeter for measuring a flow rate of a fluid, the flowmeter comprising:
    a vortex-type detection unit including:
        a measurement tube to be inserted in a flow passage of a flow tube, for allowing passage of the fluid therethrough;
        a vortex generator disposed in the measurement tube to oppose a flow of the fluid; and
        a vortex detector for detecting a change based on a Karman vortex generated by the vortex generator;
    a thermal-type detection unit including a temperature sensor and a heating sensor disposed at opposing side walls of the vortex-type detection unit, such that the temperature sensor and the heating sensor protrude into the flow passage at opposing sides of the measurement tube, and such that the temperature sensor and the heating sensor obtain temperature measurements of the fluid at different locations within the measurement tube; and
    a flow rate converter configured to:
        control an amount of power supplied to heat the heating sensor so as to maintain a constant temperature difference between the temperature sensor and the heating sensor;
        calculate the flow rate of the fluid based on the amount of power supplied to the heating sensor; and
        calculate the flow rate of the fluid based on the change detected by the vortex detector.

2. A multi-vortex flowmeter according to claim 1,
    wherein the temperature sensor and the heating sensor are arranged at the measurement tube, and
    wherein the measurement tube is provided with a sensor retaining portion for retaining the temperature sensor and the heating sensor.

3. A multi-vortex flowmeter according to claim 2,
    wherein the measurement tube and the sensor retaining portion are integrated with each other and formed as a single component.

4. A multi-vortex flowmeter according to claim 3,
wherein respective forward ends of the temperature sensor and the heating sensor are arranged at a portion around a center of the flow tube.

5. A multi-vortex flowmeter according to claim 3,
wherein the vortex-type detection unit and the thermal-type detection unit are formed so that the vortex-type detection unit is capable of insertion and extraction with respect to a hole formed in the flow tube.

6. A multi-vortex flowmeter according to claim 2,
wherein respective forward ends of the temperature sensor and the heating sensor are arranged at a portion around a center of the flow tube.

7. A multi-vortex flowmeter according to claim 2,
wherein the vortex-type detection unit and the thermal-type detection unit are formed so that the vortex-type detection unit is capable of insertion and extraction with respect to a hole formed in the flow tube.

8. A multi-vortex flowmeter according to claim 1,
wherein respective forward ends of the temperature sensor and the heating sensor are arranged at a portion around a center of the flow tube.

9. A multi-vortex flowmeter according to claim 8,
wherein the vortex-type detection unit and the thermal-type detection unit are formed so that the vortex-type detection unit is capable of insertion and extraction with respect to a hole formed in the flow tube.

10. A multi-vortex flowmeter according to claim 1,
wherein the vortex-type detection unit and the thermal-type detection unit are formed so that the vortex-type detection unit is capable of insertion and extraction with respect to a hole formed in the flow tube.

11. A multi-vortex flowmeter for measuring a flow rate of a fluid, the flowmeter comprising:
a vortex-type detection unit including:
a measurement tube to be inserted in a flow passage of a flow tube, for allowing passage of the fluid therethrough;
a vortex generator disposed in the measurement tube to oppose a flow of the fluid; and
a vortex detector for detecting a pressure change based on a Karman vortex generated by the vortex generator;
a thermal-type detection unit including a temperature sensor and a heating sensor disposed at opposing side walls of the vortex-type detection unit such that the temperature sensor and the heating sensor protrude into the flow passage at opposing sides of the measurement tube, and such that the temperature sensor and the heating sensor obtain temperature measurements of the fluid at different locations within the measurement tube; and
a flow rate converter configured to:
control an amount of power supplied to heat the heating sensor so as to maintain a constant temperature difference between the temperature sensor and the heating sensor;
calculate the flow rate of the fluid based on the amount of power supplied to the heating sensor; and
calculate the flow rate of the fluid based on the pressure change detected by the vortex detector.

12. A multi-vortex flowmeter according to claim 11,
wherein the temperature sensor and the heating sensor are arranged at the measurement tube, and
wherein the measurement tube is provided with a sensor retaining portion for retaining the temperature sensor and the heating sensor.

13. A multi-vortex flowmeter according to claim 12,
wherein the measurement tube and the sensor retaining portion are integrated with each other and formed as a single component.

14. A multi-vortex flowmeter according to claim 13,
wherein respective forward ends of the temperature sensor and the heating sensor are arranged at a portion around a center of the flow tube.

15. A multi-vortex flowmeter according to claim 13,
wherein the vortex-type detection unit and the thermal-type detection unit are formed so that the vortex-type detection unit is capable of insertion and extraction with respect to a hole formed in the flow tube.

16. A multi-vortex flowmeter according to claim 12,
wherein respective forward ends of the temperature sensor and the heating sensor are arranged at a portion around a center of the flow tube.

17. A multi-vortex flowmeter according to claim 12,
wherein the vortex-type detection unit and the thermal-type detection unit are formed so that the vortex-type detection unit is capable of insertion and extraction with respect to a hole formed in the flow tube.

18. A multi-vortex flowmeter according to claim 11,
wherein respective forward ends of the temperature sensor and the heating sensor are arranged at a portion around a center of the flow tube.

19. A multi-vortex flowmeter according to claim 18,
wherein the vortex-type detection unit and the thermal-type detection unit are formed so that the vortex-type detection unit is capable of insertion and extraction with respect to a hole formed in the flow tube.

20. A multi-vortex flowmeter according to claim 11,
wherein the vortex-type detection unit and the thermal-type detection unit are formed so that the vortex-type detection unit is capable of insertion and extraction with respect to a hole formed in the flow tube.

* * * * *